Dec. 22, 1931.         R. G. COATES         1,837,949
OPERATING MECHANISM FOR CLUTCHES
Filed April 9, 1928
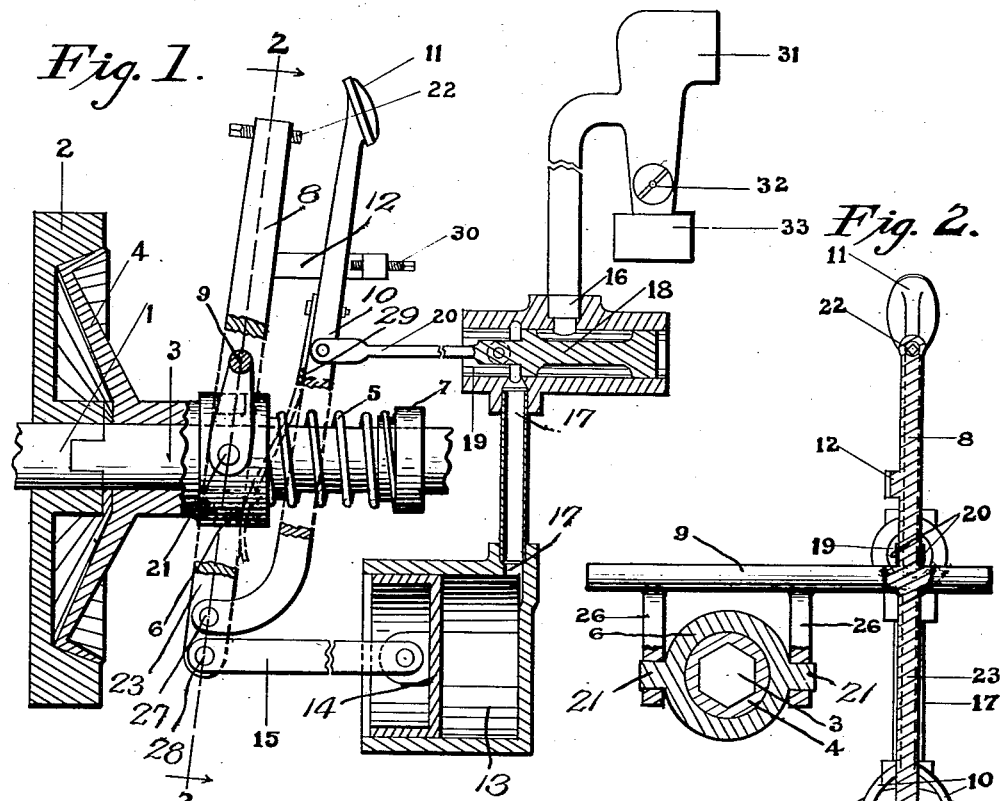
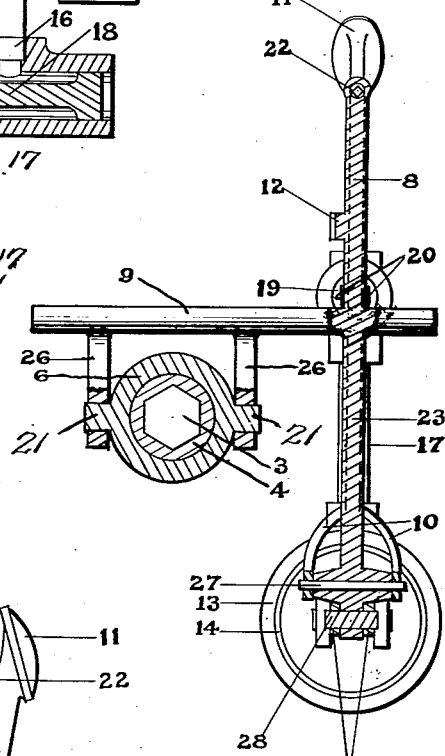
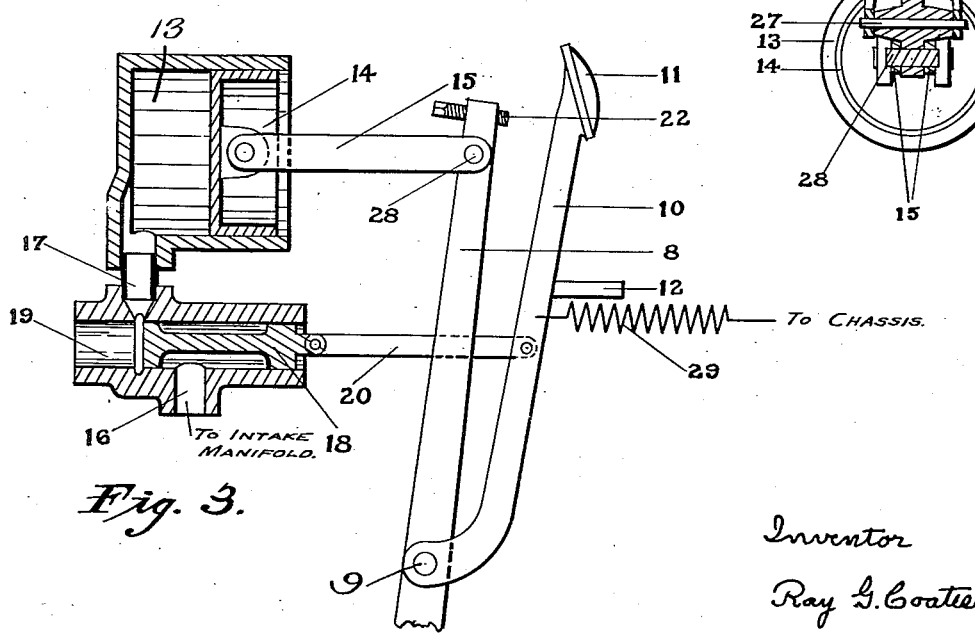
Inventor
Ray G. Coates Patented Dec. 22, 1931

1,837,949

UNITED STATES PATENT OFFICE

RAY G. COATES, OF PASADENA, CALIFORNIA

OPERATING MECHANISM FOR CLUTCHES

Application filed April 9, 1928. Serial No. 268,631.

My invention relates to gas engine clutches for motor cars in which it is now the general practice to close the clutch, connecting the engine to the wheels, by a spring and to open it by pressure on a pedal which compresses the spring and simultaneously withdraws the engaging member of the clutch, thereby permitting the engine to run independently of the movement of the car. If the open condition of the clutch is to be more than momentary the effort required to keep the clutch spring compressed becomes tiring because the initial spring pressure is considerable when large powers pass through the clutch. In the dense traffic of cities the work of handling the clutch becomes severe. If an attempt is made to ease up the extreme effort required to open the clutch by increasing the leverage of the pedal the result is an increased travel of the foot and the entire work is still done by the driver.

An object of my improvement is to render less laborious the effort to open the clutch.

A second object is to make the effort of holding the clutch open so small that it can be held open for a considerable time without tiring the driver and with less necessity of putting the gears in neutral so frequently as the present constructions demand.

A third object is to accomplish the above results without any consciousness on the part of the driver of any change in the operation of the clutch other than very easy operation.

Another object is to obtain the above new characteristics without interfering with the operation of the clutch in the way now practiced if the latter is desired.

I accomplish the above results by utilizing the first movements of the driver to apply auxiliary power to assist his efforts in opening the clutch. This application of auxiliary power requires but a fractional part of the effort necessary to open the clutch directly by the strength of the driver exerted on the pedal, and as much power as desired may be applied so that in normal operation practically the entire work of opening the clutch may be done by the power of the engine.

Owing to the large variety of clutch designs and operating mechanisms it is possible to carry out my invention in many ways. The design herewith shown is diagrammatic and illustrates one way of applying my invention yet I contemplate applying it to all designs of clutch to which it may be applicable and do not limit myself to the particular construction illustrated.

In the drawings Figure 1 represents a diagrammatical longitudinal view of an engine shaft and the attached flywheel with a cone clutch of the simplest construction in a closed position with my invention incorporated. Parts of the figure are self evidently in section to more clearly explain the principles involved. Figure 2 represents a cross sectional view of Figure 1 on the line 2—2. Figure 3 represents a longitudinal partly sectional diagrammatical view of a variant construction. Similar numbers refer to equivalent parts in the various figures.

In the drawings the engine shaft 1 carries the usual flywheel 2 and in this case the latter is formed into an internal cone into which the external cone 4 enters when the clutch is engaged. Cone 4 slides longitudinally along the separate shaft 3 but rotates with 3. Cone 4 is held against the internal cone 2 by the pressure of spring 5 against its hub, the opposite thrust of 5 being taken by the collar 7 securely attached to 3 and turning with it. The hub of 4 has a groove in which the customary shifting collar 6 (shown dotted) is fitted. When 6 is moved to the right cone 4 is moved with it and the spring 5 is compressed to a greater tension. The collar 6 is connected to the main unclutching lever 8 by the usual forked members 26 26 which engage studs 21 21 on opposite sides of the collar. The lever 8, which designates the member which commonly carries the clutch pedal, is rigid with the shaft 9. This shaft 9 carries the "fork", bars 26 26, for moving the shifting collar 6, and it is supported on bearings, not shown, attached to either the engine structure or to the chassis structure so that the distance between the fulcrum and the engine will not change when the clutch is opened and closed. To this point the description covers the elements of the common form of cone clutch, which latter is herein used to illustrate my invention.

A chamber 13, of which the sides and one end form a solid structure, is closed on the remaining side by an airtight movable element 14 which element is connected by the pitman rod 15 and the pin 28 to the lower end of a downward extension of the lever 8 marked 23 in Figures 1 and 2. The chamber 13 is securely fixed, either directly or indirectly through the chassis, to the engine structure so that the distance between it and the engine is a fixed one. The chamber 13 is provided with a port 17 leading to a valve chamber 19 in which a slide valve 18 moves over the port 17. This valve 18 also controls a port 16 in the valve chamber 19. In the figure the valve is shown as a piston valve. Valve 18 is arranged to connect 16 to 17 or 17 with the left hand end of the valve chamber 19 but not both connection at the same time. The figure shows the valve 18 in its extreme right hand position. The valve chamber 19 should be long enough to allow for the maximum stroke of the valve 18 and at its left hand end it should be vented to the atmosphere. The port 16 is not to be connected to the atmosphere through the valve chamber 19 by any position of the valve 18.

An auxiliary lever 10 is fulcrumed on the extension 23 by the pin 27 and carries at its upper end the usual pedal or foot piece 11 through which the efforts of the driver are received. The lever 10 is connected by the connecting rod 20, as shown, to the valve 18 so that any movement of 11 to the left is accompanied by a corresponding movement of the valve 18. The lever 10 is limited in its movements towards the right by a stop 30 which is carried by the end of a hooked arm 12 extending from 8 to the far side of 10, so that when lever 10 is in contact with stop 30 the valve 18 will hold the port 17 shut off from port 16 and open to the left end of valve chamber 19, which latter is vented to the atmosphere. When the auxiliary lever 10 is moved to the left enough to open the port 17 to the port 16 then this lever 10 comes against a stop 22 at the upper end of the lever 8 and any further movement of the lever 10 to the left will cause the lever 8 to move to the left with it. By making the stops 22 and 30 in the form of screws, as shown, the contact points may be so adjusted that the stroke of the valve 18 may be brought to the maximum opening position of ports 16 and 17 before the lever 10 picks up the lever 8 and also to the desired position for cutting 17 from 16 when lever 10 is at its extreme right hand position. When the clutch is open the lever 8 always tends to move to the right because of the pressure of the clutch spring 5. The lever 10 is also under the pressure of spring 5 for that part of its stroke which is in contact with lever 8.

In order to bring 10 back to its contact with the stop 30 (see Figure 1) a spring 29, strong enough to overcome the friction of the valve 18 plus the resistance of lever 10 itself is attached to 10 and reacts on the lever 8 so that 10 will move promptly to the right. This spring 29 has but little work to do and therefore may be of small strength and it represents the only force required to be overcome in normal operation of my invention.

The port 16 is connected, by a suitable pipe, to the inlet manifold of the engine. The elements 31, 32, and 33 are conventional representations, respectively, of the intake manifold, the throttle, and the carburetor.

In operation the driver presses on the pedal 11 and thereby moves valve 18 to the left and connects ports 16 and 17 thus allowing the pressure in chamber 13 to equalize with the low pressure in the inlet manifold of the engine. The atmospheric pressure then moves the element 14 to the right (in Fig. 1) and this element carries with it the connected extension 23 and the clutch member 4 is moved to the right against the pressure of spring 5 and the clutch starts to open. The movement of 23 to the right carries with it the lower end of pedal lever 10 and this, through the connection 20, tends to move valve 18 to the right and thus again cut off port 16 from port 17 and open 17 to the atmosphere through valve chamber 19. To avoid this the driver simply follows the retreating stop 22 with the lever 10 until the clutch is fully open. The only work done by the driver is that of compressing the weak spring 29. If the driver releases the pressure on pedal 11 the lever 10 moves to the right under the reaction of spring 29 and thus moves the valve 18 so as to cut off port 16 from port 17 and vent 17 to the atmosphere. This equalizes the pressures on the sides of the element 14 and thus allows the clutch spring 5 to close the clutch. By a proper design of the port 17 and the "cutting off edges" of the valve 18 a "dash pot effect" may be had to prevent a too rapid closing of the clutch. If it is desired to open the clutch when the engine is not running, or in any emergency, the continued pressure of pedal 11 against the resistance of stop 22 in a "follow through" movement will carry 8 to the left and mechanically open the clutch with an effort no greater than is now the regular practice. If the driver is "following through", as just described, the element 14 does not offer any material resistance because the valve 18 uncovers the port 16 before lever 10 picks up the lever 8 and the inlet manifold pressure is never greater than that of the atmosphere except in the unusual cases of "superchargers".

The chamber 13 may be placed in any convenient location provided the element 14 is directly or indirectly connected to an operative member of the clutch so that the latter tends to open when the pressure in 13 falls below the atmospheric pressure.

Antifriction devices are in common use for relieving the friction on the collar 6 or its equivalents. Such devices I contemplate using in my improvement. Many other refinements are now common in clutch construction, and I contemplate using all of the improvements known in the present state of the art where such are applicable.

While the valve illustrated is a piston valve I do not limit myself to this form of valve but contemplate using any form now known in this art which may be desirable for this use.

I have shown, in Figures 1 and 2, the lever 10 as fulcrumed on the extension 23 which latter is a moving member of the clutch. The effect of this construction is to require the driver to "follow through" with the pedal 11, as in the present practice, in order to fully open the clutch. It is, not necessary to fulcrum 10 on a moving member such as the extension 23. This is shown diagrammatically in Figure 3 where 10 is loosely fulcrumed on shaft 9 the axis of lever 8. In this case the clutch opens fully simply by moving the pedal until the lever 10 reaches the position of stop 22. This fully opens the valve 18 and it is not necessary to follow through with the pedal 11 for a complete stroke. In this construction the stop 30 and arm 12 should not be on a moving member of the clutch but should be attached to the engine or chassis structure so as to maintain a fixed position. Further the valve chamber 19 should be long enough to permit the valve 18 to "over run" its usual stroke without any change in the relation of ports 16 and 17 to each other while the pedal 11 might be making a follow through stroke in any emergency. And again the spring 29 should be attached to the lever 10 and to the chassis as shown in Figure 3 at 29 instead of to a moving member of the clutch as shown in Figures 1 and 2.

Having thus described my invention what I claim as new is:

The combination with an automobile motor having an intake manifold, a carburetor, a throttle, a spring closed clutch, and a clutch controlling lever, of a pedal lever contacting with and fulcrumed on said clutch controlling lever at some distance from the fulcrum of the latter lever and with the pedal of said pedal lever at approximately an equal distance on the other side of the fulcrum of said clutch controlling lever, stops positioned to limit the angular movement between said levers, yielding means for normally holding said pedal lever at its maximum angular distance from contact with said clutch controlling lever, a piston, means for operatively connecting said piston to said clutch controlling lever, a cylinder in which said piston is movable closed at the end in advance of the piston, a conduit between said cylinder and said intake manifold, a valve in said conduit connected to said pedal lever between its fulcrum and its pedal, said valve positioned to admit atmospheric pressure to said cylinder and to shut off communication with the intake manifold when said pedal lever is released, and to shut off the atmospheric pressure and open communication with the intake manifold when said pedal lever is depressed.

RAY G. COATES.